(12) United States Patent
Xu

(10) Patent No.: US 11,215,912 B1
(45) Date of Patent: Jan. 4, 2022

(54) REFLECTIVE DYNAMIC PROJECTOR AND STARRY SKY LAMP

(71) Applicant: Shenzhen Jingdu Technology Co., Ltd., Shenzhen (CN)

(72) Inventor: Shaoyuan Xu, Shenzhen (CN)

( * ) Notice: Subject to any disclaimer, the term of this patent is extended or adjusted under 35 U.S.C. 154(b) by 0 days.

(21) Appl. No.: 17/235,947

(22) Filed: Apr. 21, 2021

(30) Foreign Application Priority Data

Jan. 29, 2021 (CN) .......................... 202110129937.9

(51) Int. Cl.
```
F21V 9/08    (2018.01)
G03B 21/20   (2006.01)
F21V 13/10   (2006.01)
G03B 21/14   (2006.01)
G03B 21/28   (2006.01)
F21K 9/232   (2016.01)
```

(52) U.S. Cl.
CPC .......... *G03B 21/2046* (2013.01); *F21K 9/232* (2016.08); *F21V 13/10* (2013.01); *G03B 21/142* (2013.01); *G03B 21/28* (2013.01)

(58) Field of Classification Search
CPC ................................. F21S 10/02; F21V 14/02
See application file for complete search history.

(56) References Cited

U.S. PATENT DOCUMENTS

| | | | |
|---|---|---|---|
| 7,784,964 B2 | 8/2010 | Yen | |
| 9,909,739 B2 | 3/2018 | Chien | |
| 10,928,021 B2 | 2/2021 | Chien | |
| 2009/0103293 A1* | 4/2009 | Harbers | F21K 9/65 362/231 |
| 2021/0164628 A1* | 6/2021 | Zheng | F21V 5/005 |

FOREIGN PATENT DOCUMENTS

CN        204328861 U      5/2015

\* cited by examiner

*Primary Examiner* — Andrew J Coughlin

(57) ABSTRACT

A reflective dynamic projector includes a light projection device. The light projection device includes a reflective element with a reflective surface, a plurality of first light sources, and a first driving unit. There are bump textures arranged on the reflective surface which make the reflective surface to be a diffuse reflection surface. The reflective surface surrounds the plurality of first light sources and each of the plurality of first light sources is arranged towards the reflective surface; or an outer surface of the reflective element is the reflective surface, the plurality of first light sources surrounds the reflective element, and each of the plurality of first light sources is arranged towards the reflective surface. The first driving unit is connected with the reflective element or the plurality of first light sources and drives the reflective element or the plurality of first light sources to rotate.

18 Claims, 7 Drawing Sheets

REFLECTIVE DYNAMIC PROJECTOR AND STARRY SKY LAMP

CROSS-REFERENCE TO RELATED APPLICATIONS

This application claims priority to Chinese Patent Application No. 202110129937.9, filed on Jan. 29, 2021, the contents of which are incorporated by reference herein.

FIELD

The subject matter herein generally relates to starry sky lamps, and particularly relates to a reflective dynamic projector and a starry sky lamp.

BACKGROUND

With the development of society, people's quality of life is getting higher and higher. In a variety of environmental occasions, different lamps are usually used to decorate and light. Due to the fast rhythm of life, modern people don't have enough time to enjoy the beautiful night sky in the wild. In addition, due to the weather, geographical locations and other factors, it is usually difficult to see all kinds of strange astronomical views. Therefore, people have designed some lamps to simulate the starry sky. At present, existing starry sky projection lamps on the market generally adopts direct light sources to realize the light effect projection. However, this kind of technology needs larger size glass lens, and the lens itself is heavy and difficult to manufacture, which may affect the shape and structure design of the starry sky projection lamps. In addition, the glass lens is also heavy, which is more prone to be damaged when falling down, thus affecting the service life of the starry sky projection lamp.

SUMMARY

The present disclosure provides a reflective dynamic projector and a starry sky lamp with the reflective dynamic projector which can resolve the above-mentioned technological problems.

A reflective dynamic projector includes a light projection device. The light projection device includes a reflective element with a reflective surface, wherein there are bump textures arranged on the reflective surface which make the reflective surface to be a diffuse reflection surface; a plurality of first light sources, wherein the reflective surface surrounds the plurality of first light sources and each of the plurality of first light sources is arranged towards the reflective surface; or an outer surface of the reflective element is the reflective surface, the plurality of first light sources surrounds the reflective element, and each of the plurality of first light sources is arranged towards the reflective surface; and a first driving unit, configured to connected with the reflective element or the plurality of first light sources and drive the reflective element or the plurality of first light sources to rotate.

In at least one embodiment, the reflective dynamic projector further includes a first pattern projection device configured to project light with patterns, wherein a projection area of the first pattern projection device is interlapped with that of the light projection device.

In at least one embodiment, the reflective dynamic projector further includes a first support element configured to support the plurality of first light sources, the first driving unit is a motor, and the first support element is arranged on an output axis of the motor.

In at least one embodiment, the reflective dynamic projector further includes a second driving unit, a first gear is arranged on an output axis of the second driving unit, a second gear is connected with the reflective element and is meshed with the first gear, a differential gear group is connected with the first pattern projection device and is meshed with the first gear.

In at least one embodiment, the first pattern projection device comprises a light guiding sleeve, a pattern light source is arranged at one end of the light guiding sleeve and a gating sheet is arranged at the other end of the light guiding sleeve, the differential gear group comprises a third gear and a fourth gear meshed with the third gear, the third gear is meshed with the first gear, and the fourth gear is arranged on the light guiding sleeve.

In at least one embodiment, the reflective dynamic projector further includes a second support element for supporting the plurality of first light sources, the first driving unit is a motor, an output axis of the motor extends through the second support element to connect with the reflective element.

In at least one embodiment, the first pattern projection device comprises a light guiding sleeve, a mounting space configured to mount the plurality of first light sources is defined at one end of the light guiding sleeve and a gating sheet is arranged at the other end of the light guiding sleeve.

In at least one embodiment, the reflective dynamic projector further includes a fifth gear and a sixth gear meshed with the fifth gear, the fifth gear is arranged on the output axis of the motor and the sixth gear is arranged on the light guiding sleeve, a diameter of the fifth gear is different from that of the sixth gear.

In at least one embodiment, the reflective dynamic projector further includes a light-transmitting light shade configured to cover the reflective element.

In at least one embodiment, there is a plurality of protrudes arranged on an inner wall of the light-transmitting light shade.

A starry sky lamp includes a case, a light-transmitting cover arranged on the case to form a receiving space; and a reflective dynamic projector received in the receiving space, comprising a light projection device. The light projection device includes a reflective element with a reflective surface, there are bump textures arranged on the reflective surface which make the reflective surface to be a diffuse reflection surface; a plurality of first light sources, wherein the reflective surface surrounds the plurality of first light sources and each of the plurality of first light sources is arranged towards the reflective surface; or an outer surface of the reflective element is the reflective surface, the plurality of first light sources surrounds the reflective element, and each of the plurality of first light sources is arranged towards the reflective surface; and a first driving unit, configured to connected with the reflective element or the plurality of first light sources and drive the reflective element or the plurality of first light sources to rotate.

In at least one embodiment, the reflective dynamic projector further comprises a first pattern projection device configured to project light with patterns, wherein a projection area of the first pattern projection device is interlapped with that of the light projection device.

In at least one embodiment, the reflective dynamic projector further comprises a first support element configured to support the plurality of first light sources, the first driving unit is a motor, and the first support element is arranged on an output axis of the motor.

In at least one embodiment, the reflective dynamic projector further comprises a second driving unit, a first gear is arranged on an output axis of the second driving unit, a second gear is connected with the reflective element and is meshed with the first gear, a differential gear group is connected with the first pattern projection device and is meshed with the first gear.

In at least one embodiment, the first pattern projection device comprises a light guiding sleeve, a pattern light source is arranged at one end of the light guiding sleeve and a gating sheet is arranged at the other end of the light guiding sleeve, the differential gear group comprises a third gear and a fourth gear meshed with the third gear, the third gear is meshed with the first gear, and the fourth gear is arranged on the light guiding sleeve.

In at least one embodiment, the reflective dynamic projector further comprises a second support element for supporting the plurality of first light sources, the first driving unit is a motor, an output axis of the motor extends through the second support element to connect with the reflective element.

In at least one embodiment, the first pattern projection device comprises a light guiding sleeve, a mounting space configured to mount the plurality of first light sources is defined at one end of the light guiding sleeve and a gating sheet is arranged at the other end of the light guiding sleeve.

In at least one embodiment, the reflective dynamic projector further comprises a fifth gear and a sixth gear meshed with the fifth gear, the fifth gear is arranged on the output axis of the motor and the sixth gear is arranged on the light guiding sleeve, a diameter of the fifth gear is different from that of the sixth gear.

In at least one embodiment, the reflective dynamic projector further comprises a light-transmitting light shade configured to cover the reflective element.

In at least one embodiment, there is a plurality of protrudes arranged on an inner wall of the light-transmitting light shade.

When the reflective dynamic projector and the starry sky lamp are used, the first light sources emit light onto the reflective surface of the reflective element which is a diffuse reflection surface. The light is diffusely reflected. Because the reflective surface is arranged surrounding the plurality of first light sources, or the plurality of first light sources are arranged surrounding the reflective surface, the light emitted out from each first light source is diffusely reflected and diffusely reflected light is interlapped with each other. When the reflective element or the first light sources are driven to rotate, light is interlapped with each other to form a light effect of aurora. The reflective dynamic projector or the starry sky lamp can project light with the light effect of aurora without glass lens needed in the existing starry sky lamps. Thus, the structure is simplified, the weight is lightened, and the possibility of damage is thus reduced.

BRIEF DESCRIPTION OF THE DRAWINGS

Implementations of the present disclosure will now be described, by way of embodiment, with reference to the attached figures. It should be understood, the drawings are shown for illustrative purpose only, for ordinary person skilled in the art, other drawings obtained from these drawings without paying creative labor by an ordinary person skilled in the art should be within scope of the present disclosure.

DETAILED DESCRIPTION

Figure 1:
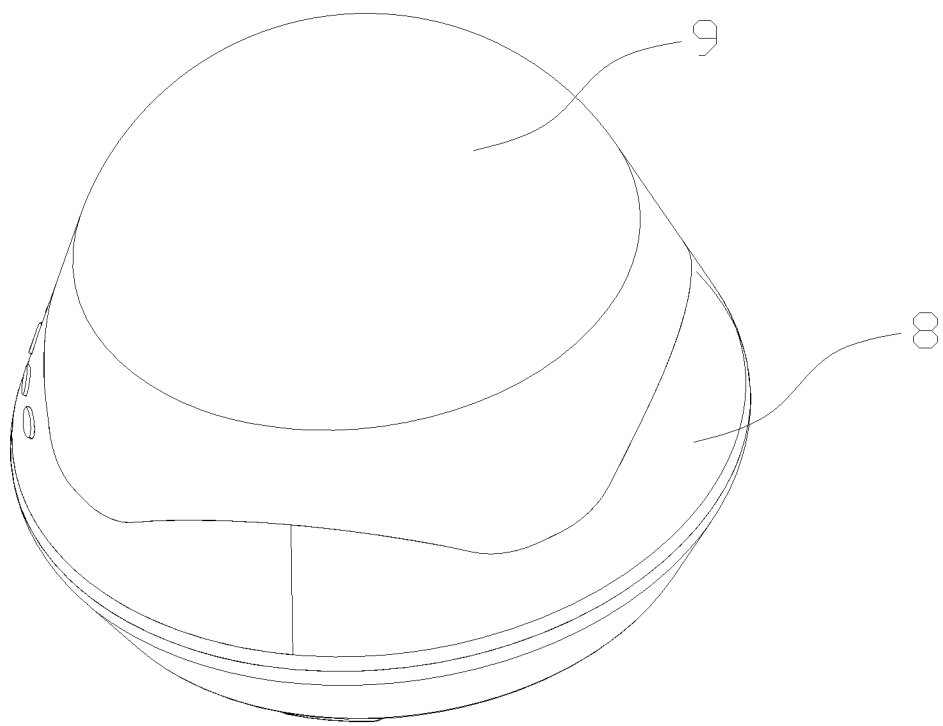
FIG. 1 is a schematic view of a starry lamp according to a first embodiment of the present disclosure.

It will be appreciated that for simplicity and clarity of illustration, where appropriate, reference numerals have been repeated among the different figures to indicate corresponding or analogous elements. In addition, numerous specific details are set forth in order to provide a thorough understanding of the exemplary embodiments described herein. However, it will be understood by those of ordinary skill in the art that the exemplary embodiments described herein may be practiced without these specific details. In other instances, methods, procedures, and components have not been described in detail so as not to obscure the related relevant feature being described. Also, the description is not to be considered as limiting the scope of the exemplary embodiments described herein. The drawings are not necessarily to scale and the proportions of certain parts may be exaggerated to better illustrate details and features of the present disclosure.

The term "comprising" when utilized, means "including, but not necessarily limited to"; it specifically indicates open-ended inclusion or membership in the so-described combination, group, series, and the like. The disclosure is illustrated by way of example and not by way of limitation in the figures of the accompanying drawings in which like references indicate similar elements. It should be noted that references to "an" or "one" embodiment in this disclosure are not necessarily to the same embodiment, and such references can mean "at least one". In addition, the terms "first" and "second" are used for descriptive purposes only and cannot be understood as indicating or implying relative importance or implying the number of indicated technical features. Thus, the features defined as "first" and "second" may explicitly or implicitly include one or more of the said features. In the description of embodiments of the invention, "a plurality of" means two or more, unless otherwise specifically defined.

Figure 2:
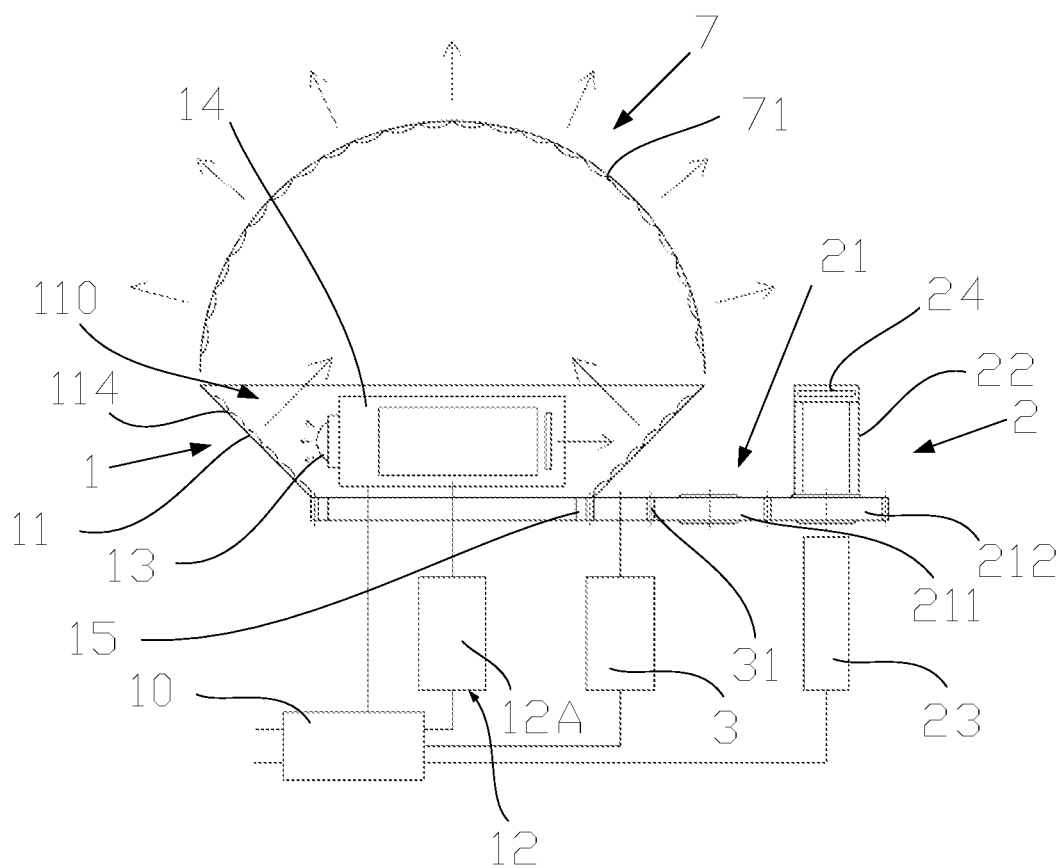
FIG. 2 is schematic view of a reflective dynamic light projector according to a first embodiment of the present disclosure.

Referring to FIGS. 1-2, an embodiment of the present disclosure provides a starry sky lamp including a case 8 and a reflective dynamic projector at least partly arranged inside the case 8. The case 8 protect the reflective dynamic projector from being damaged. Further, in at least one embodiment, the case 8 can used as a support for supporting the starry sky lamp on a supporting surface, such as a table, or the ground. The case 8 can be hemispherical. It should be understood that the case 8 can be any other suitable shape, such as a cuboid or a polyhedron.

In at least one embodiment, the starry sky lamp further includes a light-transmitting cover 9 configured to cover the reflective dynamic projector and protect the reflective dynamic projector from being damaged.

Referring to FIG. 2, according to a first embodiment, the reflective dynamic projector includes a light projection device 1. The light projection device 1 may include a reflective element 11, a first driving unit 12, and a plurality of first light sources 13. The reflective element 11 is provided with a reflective surface 114 inside thereof. The reflective surface 114 is provided with bump textures, thus the reflective surface 114 is a diffuse reflection surface. The reflective surface 114 surrounds the plurality of first light sources 13 and each of the plurality of first light sources 13 is arranged towards the reflective surface 114, so that the light projection device 1 can project the light emitted by the plurality of first light sources 13 to obtain light effect. The first driving unit 12 is connected to the reflective element 11 or the plurality of first light sources 13 and is configured to drive the reflective element 11 or the plurality of first light sources 13 to rotate.

When in use, the first light sources 13 emit light onto the reflective surface 114 of the reflective element 11. The light is diffusely reflected because the reflective surface 114 is a diffuse reflection surface. Because the reflective surface 114 surrounds the plurality of first light sources 13 and each of the first light sources 13 is arranged towards the reflective surface 114, the light is reflected and interlapped to form light effect. When the reflective element 11 or the plurality of first light sources 13 is driven to rotate, multiple light shadows are formed to produce a light effect of aurora. The light projection device 1 provided by the present disclosure does not need the glass lenses in the existing starry sky lamps, thus being simple in structure, light-weighted and not easy to be damaged.

In at least one embodiment, the reflective dynamic projector further includes a first pattern projection device 2 configured to project light with patterns. The projection area of the light projection device 1 is overlapped with that of the first pattern projection device 2. The first pattern projection device 2 can project light with patterns such as star and moon. The light effect of aurora is overlapped with the light with patterns such as star and noon to create a light effect of a night sky scene.

In at least one embodiment, the reflective dynamic projector further includes a first support element 14 configured to support the plurality of first light sources 13. The first driving unit 12 can include a motor 12A, and the first support element 14 is arranged on an output axis of the motor 12A. The motor 12A can drive the first support element 14 to rotate, so as to drive the plurality of first light sources 13 to rotate to achieve the light effect of aurora.

In at least one embodiment, the reflective element 11 can be circular and has a trumpet-shaped cross-section. The reflective element 11 defines a through hole 110 in a center thereof. The plurality of first light sources 13 is arranged inside the through hole 110. The plurality of first light sources 13 can be evenly arranged along an inner peripheral wall of the reflective element 11. The light is emitted out from the first light sources 13 at the center of the reflective element 11 onto the reflective surface 114. The bump textures of the reflective surface 114 can be regular or irregular. For example, the bump textures can be any one or a combination of spherical, conical, polygonal and other suitable shapes. It should be understood that the shape of the reflective element 11 can be any other suitable shape, such as sphere, a cone, or a polyhedron.

In at least one embodiment, the reflective dynamic projector 1 further includes a second driving unit 3. A first gear 31 is arranged on an output axis of the second driving unit 3. The second driving unit 3 can be a motor. A second gear 15 is connected with the reflective element 11. The second gear 15 is meshed with the first gear 31. The first pattern projection device 2 is connected with a differential gear group 21 meshed with the first gear 31. The second driving unit 3 can drive the first gear 31 to rotate so as to drive the reflective element 11 to rotate through the second gear 15. Thus, the reflective element 11 and the plurality of first light sources 13 can rotate at the same time and the light effect of aurora can be further enhanced. The second driving unit 3 further can drive the first pattern projection device 2 to rotate through the differential gear group 21. That is, the light with patterns can rotate along with the first pattern projection device 2. There will be a rotation speed difference between the light with patterns and the light effect of aurora due to the differential gear group 21, so that the starry sky lamp can project light with an effect of moving starry sky, which further improves user experiences.

In at least one embodiment, the first pattern projection device 2 includes a light guiding sleeve 22. One end of the light guiding sleeve 22 is provided with a pattern light source 23, and the other end of the light guiding sleeve 22 is provided with a grating sheet 24. The differential gear group 21 includes a third gear 211 and a fourth gear 212 meshed with the third gear 211. The third gear 211 is meshed with the first gear 31. The fourth gear 212 is arranged on the light guiding sleeve 22. Through the pattern projection device 2, the light with patterns is provided. A diameter of the third gear 211 and the diameter of the fourth gear 212 are different from that of the first gear 31, therefore, there will be a rotation speed difference between the third gear 211, the fourth gear 212 and the first gear 31.

In at least one embodiment, the reflective dynamic projector further includes a light-transmitting lamp shade 7. The light-transmitting light shade 7 covers the reflective element 11. There is a plurality of protrudes 71 arranged on an inner wall of the light shade. The reflective element 11 cooperates with the light-transmitting light shade 7 can achieve more light effect. In at least one embodiment, the light-transmitting light shade 7 can be in any other suitable structure.

In at least one embodiment, the reflective dynamic projector further includes a circuit board 10. The circuit board 10 is electrically connected with the motor 12A, the second driving unit 3, the pattern light source 23, and the first light sources 13. The first light sources 13 or the pattern light source 23 can include laser light sources and/or RGB light sources. In at least one embodiment, the first light source 13 can be a light array with laser light sources and RGB light sources alternately arranged. It should be understood that the light array can be in any other suitable configuration.

Figure 3:
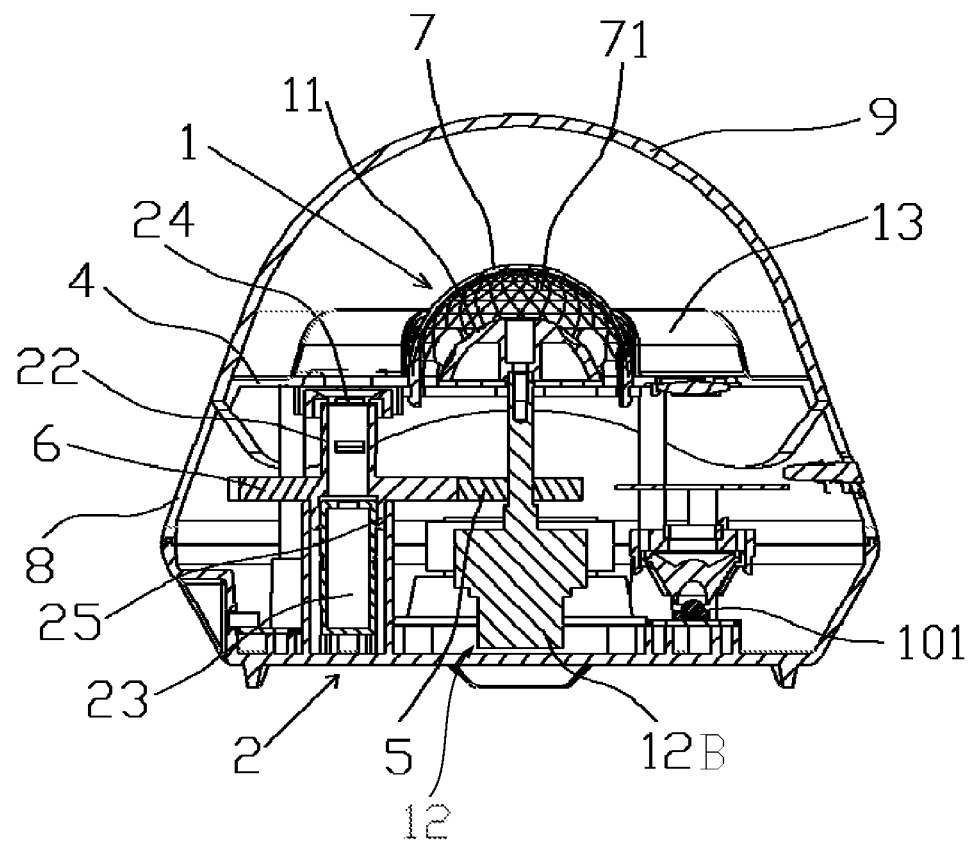
FIG. 3 is a cross-sectional view of a starry sky lamp according to a second embodiment of the present disclosure, the starry lamp including a light-transmitting protective cover, a reflective dynamic light projector with a lamp shade.
Figure 4:
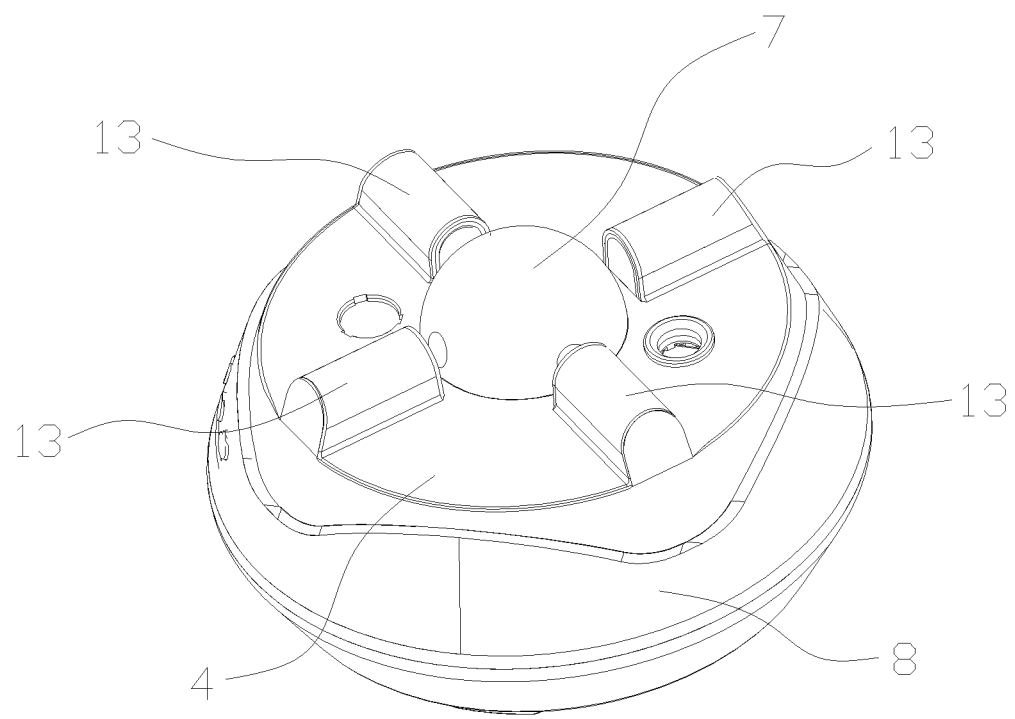
FIG. 4 is a schematic view of the starry sky lamp of FIG. 3, with the light-transmitting protective cover removed.

Referring to FIGS. 3-4, a second embodiment of the present disclosure provides a reflective dynamic projector including a light projection device 1. The light projection device 1 includes a reflective element 11, a first driving unit 12 and a plurality of first light sources 13. The reflective element 11 is provided with a reflective surface 114. The reflective surface 114 forms bump texture 114 thereon so that the reflective surface 114 is a diffuse reflection surface. The reflective surface 114 is arranged at an outer surface of the reflective element 11. The plurality of first light sources 13 are arranged around the reflective element 11 and each of the plurality of first light sources 13 is arranged towards the reflective surface 114. Therefore, the light emitted out from the first light sources can be reflected by the reflective surface 114 to form light effect. The first driving unit 12 is connected with the reflective element 11 or the plurality of first light sources 13 and configured to drive the reflective element 11 or the plurality of first light sources 13 to rotate.

When in use, the first light sources 13 emit light onto the reflective surface 114 of the reflective element 11. The light is diffused because the reflective surface 114 is a diffuse reflection surface. Because the reflective surface 114 surrounds the plurality of first light sources 13 and each of the first light sources 13 is arranged towards the reflective surface 114, the light is reflected and interlapped to form light effect. When the reflective element 11 or the plurality of first light sources 13 is driven to rotate, multiple light shadows are formed to produce a light effect of aurora. The light projection device 1 provided by the present disclosure does not need the glass lenses in the existing starry sky lamps, thus being simple in structure, light-weighted and not easy to be damaged.

In at least one embodiment, the reflective dynamic projector further includes a first pattern projection device 2 configured to project light with patterns. The projection area of the light projection device 1 is overlapped with that of the first pattern projection device 2. The first pattern projection device 2 can project light with patterns such as star and moon. The light effect of aurora is overlapped with the light with patterns such as star and noon to create a light effect of a night sky scene.

In at least one embodiment, the reflective dynamic projector further includes a second pattern projection device 101. The second pattern projection device 101 can project light with patterns such as star and moon. The second pattern projection device 101 remains non-rotating while the first pattern projection device 2 rotates. The projection area of the second pattern projection device 101 is overlapped with that of the first pattern projection device 2 and the first light projection device 1. Therefore, rotating light effect of aurora, rotating light with patterns and non-rotating light with patterns are interlapped to constitute a light effect of a night sky scene with more layers.

In at least one embodiment, the reflective dynamic projector further includes a second support element 4. The first driving unit 12 can be a motor 12B. An output axis extends through the second support element 4 to connect with the reflective element 11. The plurality of first light sources 13 is arranged on the second support element 4. The motor 12B can drive the reflective element 11 to rotate, thus bringing the reflective surface 114 to rotate to achieve the light effect of aurora.

Figure 5:
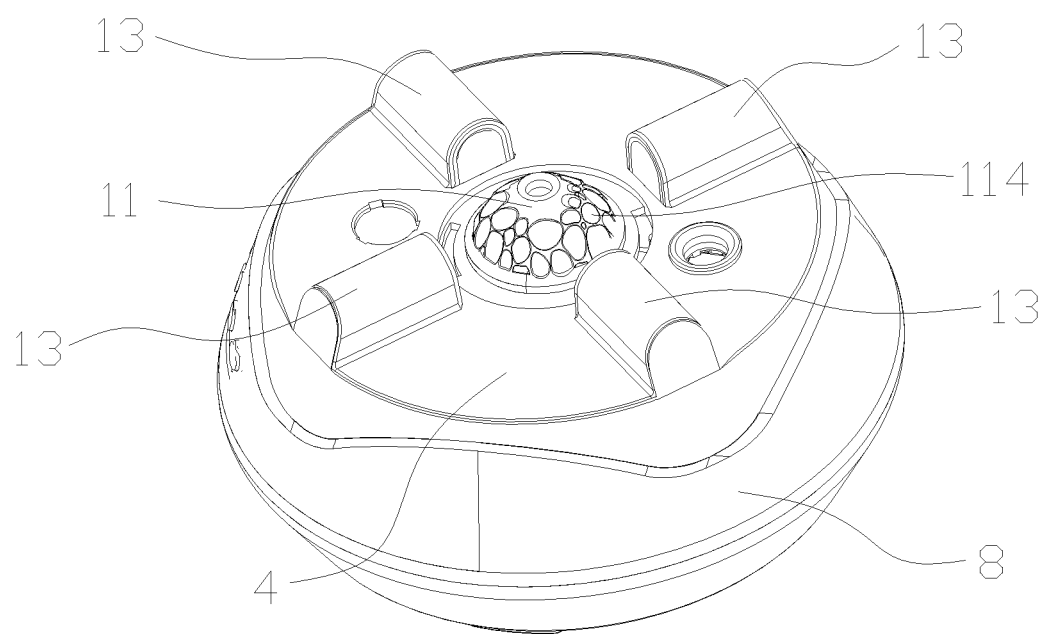
FIG. 5 is a schematic view of the starry sky lamp of FIG. 3, with the light-transmitting protective cover and the lamp shade removed.
Figure 6:
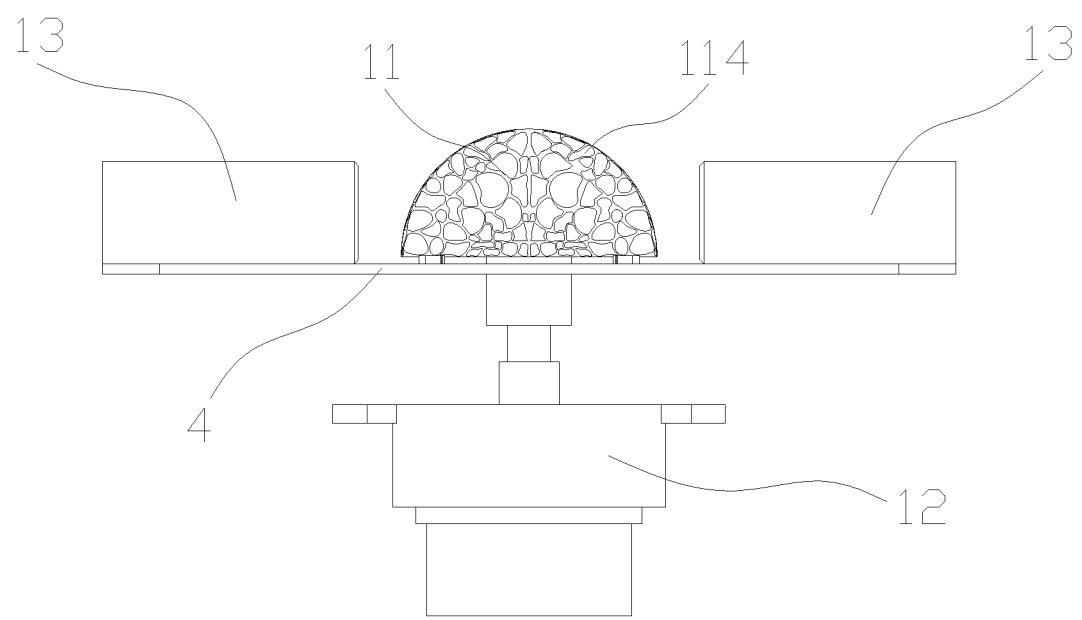
FIG. 6 is a schematic view of the reflective dynamic light projector according to a third embodiment of the present disclosure, with the light-transmitting protective cover and the lamp shade removed.
Figure 7:
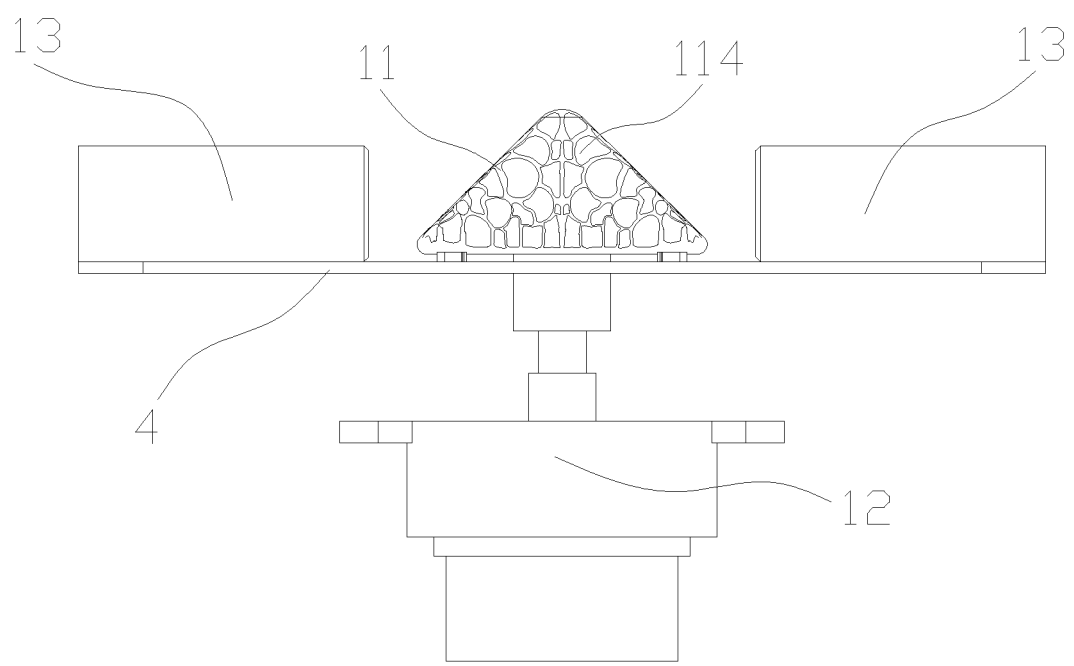
FIG. 7 is a schematic view of a reflective dynamic light projector according to a fourth embodiment of the present disclosure, with the light-transmitting protective cover and the lamp shade removed.

In the embodiment shown in FIG. 3, the reflective element 11 is a hemisphere and the bump textures are arranged in a grid. It should be understood that, the reflective element 11 can be any other suitable shape and the bump texture can be in any other suitable configuration. For example, the reflective element 11 can be bowl-shaped (shown in FIG. 5), a hemisphere (shown in FIG. 6) or a cone (shown in FIG. 7). The bump textures can be regular or irregular. For example, as shown in FIGS. 5-7, the bump textures can be a combination of irregular circles with different sizes. For example, the bump textures can include spherical, cone-shaped, or polygonal structures. It should be understood that the reflective element 11 and the bump textures can be any other suitable structures.

In at least one embodiment, the first pattern projection device 2 can include a light guiding sleeve 22. One end of the light guiding sleeve 22 defines a mounting space 25 for accommodating a pattern light source 23. The other end of the light guiding sleeve 22 is provided with a gating sheet 24. The light with patterns emitted out from the patter light source 23 goes through the light guiding sleeve 22 and the gating sheet 24 to perform projection of the light with patterns.

In at least one embodiment, the reflective dynamic projector further includes a fifth gear 5 and a sixth gear 6. The fifth gear 5 is arranged at the output axis of the motor 12B, and the sixth gear 6 is arranged on the light guiding sleeve 22. A diameter of the fifth gear 5 is different from that of the sixth gear 6, thus there is a rotation speed difference between the fifth gear 5 and the sixth gear 6, and there is a rotation speed difference between the light with patterns and the light effect of aurora. Therefore, the reflective dynamic projector of the present disclosure can achieve a light effect of moving starry sky and user's experience is further improved.

In at least one embodiment, the reflective dynamic projector further includes a light-transmitting light shade 7. The light-transmitting light shade 7 covers the reflective element 11. There is a plurality of protrudes 71 arranged on an inner wall of the light-transmitting light shade 7. The reflective element 11 cooperates with the light-transmitting light shade 7 can achieve more light effect. In at least one embodiment, there is no protrude arranged on the inner wall of the light-transmitting light shade 7 corresponding to the first light sources 13. That is, the protrudes 71 are arranged on the inner wall of the light-transmitting light shade 7 which is not corresponding to the first light sources 13. It should be understood that, in at least one embodiment, the light-transmitting light shade 7 can be in any other suitable structure.

In at least one embodiment, the reflective dynamic projector further includes a circuit board 10. The circuit board 10 is electrically connected with the motor 12B, the second driving unit 3, the pattern light source 23, and the first light sources 13. The first light sources 13 or the pattern light source 23 can include laser light sources and/or RGB light sources. In at least one embodiment, the first light source 13 can be a light array with laser light sources and RGB light sources alternately arranged. It should be understood that the light array can be in any other suitable configuration.

In at least one embodiment, the reflective element 11 can be molded by plastic injection molding or metal stamping. The surface of the reflective element 11 can be electroplated to obtain a bright reflective film to function as the reflective surface 114.

The starry sky lamp provided by the embodiment of the present disclosure includes the reflective dynamic projector partly arranged inside the case 8, and part of the reflective dynamic projector extends out from the case 8. The light projection device 1, the first pattern projection device 2 and the second pattern projection device 101 are all arranged inside the case 8. The light-transmitting cover 9 is arranged on the case 8 to form a receiving space for receiving the reflective dynamic projector. The reflective dynamic projector is arranged inside the receiving space and is protected from being damaged. The reflective dynamic projector can be the reflective dynamic projector shown in FIG. 2 or the reflective dynamic projector shown in FIGS. 3-7. The first light sources 13 emit light onto the reflective surface 114 of the reflective element 11 which is a diffuse reflection surface. The light is diffusely reflected. Because the reflective surface 114 is arranged surrounding the plurality of first light sources 13 in FIG. 2, the plurality of first light sources 13 are arranged surrounding the reflective surface 114 in FIGS. 3-7, the light emitted out from each first light source 13 is diffusely reflected and diffusely reflected light is interlapped with each other. When the reflective element 11 or the first light sources 13 are driven to rotate, light is interlapped with each other to form a light effect of aurora. The starry sky lamp can project light with the light effect of aurora without glass lens needed in the existing starry sky lamps. Thus, the structure is simplified, the weight is lightened, and the possibility of damage is thus reduced.

What is claimed is:

1. A reflective dynamic projector, comprising:
    a light projection device, comprising
        a reflective element with a reflective surface, wherein there are bump textures arranged on the reflective surface which make the reflective surface to be a diffuse reflection surface;
        a plurality of first light sources, wherein the reflective surface surrounds the plurality of first light sources and each of the plurality of first light sources is arranged towards the reflective surface; or an outer surface of the reflective element is the reflective surface, the plurality of first light sources surrounds the reflective element, and each of the plurality of first light sources is arranged towards the reflective surface; and
        a first driving unit, configured to connected with the reflective element or the plurality of first light sources and drive the reflective element or the plurality of first light sources to rotate; wherein a first pattern projection device configured to project light with patterns, wherein a projection area of the first pattern projection device is overlapped with that of the light projection device.

2. The reflective dynamic projector according to claim 1, further comprising a first support element configured to support the plurality of first light sources, the first driving unit is a motor, and the first support element is arranged on an output axis of the motor.

3. The reflective dynamic projector according to claim 2, further comprising a second driving unit, a first gear is arranged on an output axis of the second driving unit, a second gear is connected with the reflective element and is meshed with the first gear, a differential gear group is connected with the first pattern projection device and is meshed with the first gear.

4. The reflective dynamic projector according to claim 3, wherein the first pattern projection device comprises a light guiding sleeve, a pattern light source is arranged at one end of the light guiding sleeve and a gating sheet is arranged at the other end of the light guiding sleeve, the differential gear group comprises a third gear and a fourth gear meshed with the third gear, the third gear is meshed with the first gear, and the fourth gear is arranged on the light guiding sleeve.

5. The reflective dynamic projector according to claim 1, further comprising a second support element for supporting the plurality of first light sources, the first driving unit is a motor, an output axis of the motor extends through the second support element to connect with the reflective element.

6. The reflective dynamic projector according to claim 5, wherein the first pattern projection device comprises a light guiding sleeve, a mounting space configured to mount the plurality of first light sources is defined at one end of the light guiding sleeve and a gating sheet is arranged at the other end of the light guiding sleeve.

7. The reflective dynamic projector according to claim 6, further comprising a fifth gear and a sixth gear meshed with the fifth gear, the fifth gear is arranged on the output axis of the motor and the sixth gear is arranged on the light guiding sleeve, a diameter of the fifth gear is different from that of the sixth gear.

8. The reflective dynamic projector according to claim 1, further comprising a light-transmitting light shade configured to cover the reflective element.

9. The reflective dynamic projector according to claim 1, wherein there is a plurality of protrudes arranged on an inner wall of the light-transmitting light shade.

10. A starry sky lamp, comprising:
    a case,
    a light-transmitting cover arranged on the case to form a receiving space; and
    a reflective dynamic projector received in the receiving space, comprising a light projection device, the light projection device comprising
        a reflective element with a reflective surface, wherein there are bump textures arranged on the reflective surface which make the reflective surface to be a diffuse reflection surface;
        a plurality of first light sources, wherein the reflective surface surrounds the plurality of first light sources and each of the plurality of first light sources is arranged towards the reflective surface; or an outer surface of the reflective element is the reflective surface, the plurality of first light sources surrounds the reflective element, and each of the plurality of first light sources is arranged towards the reflective surface; and
        a first driving unit, configured to connected with the reflective element or the plurality of first light sources and drive the reflective element or the plurality of first light sources to rotate; wherein the reflective dynamic projector further comprises a first pattern projection device configured to project light with patterns, wherein a projection area of the first pattern projection device is overlapped with that of the light projection device.

11. The starry sky lamp according to claim 10, wherein the reflective dynamic projector further comprises a first support element configured to support the plurality of first light sources, the first driving unit is a motor, and the first support element is arranged on an output axis of the motor.

12. The starry sky lamp according to claim 11, wherein the reflective dynamic projector further comprises a second driving unit, a first gear is arranged on an output axis of the second driving unit, a second gear is connected with the reflective element and is meshed with the first gear, a differential gear group is connected with the first pattern projection device and is meshed with the first gear.

13. The starry sky lamp according to claim 12, wherein the first pattern projection device comprises a light guiding sleeve, a pattern light source is arranged at one end of the light guiding sleeve and a gating sheet is arranged at the other end of the light guiding sleeve, the differential gear group comprises a third gear and a fourth gear meshed with the third gear, the third gear is meshed with the first gear, and the fourth gear is arranged on the light guiding sleeve.

14. The starry sky lamp according to claim 10, wherein the reflective dynamic projector further comprises a second support element for supporting the plurality of first light sources, the first driving unit is a motor, an output axis of the motor extends through the second support element to connect with the reflective element.

15. The starry sky lamp according to claim 14, wherein the first pattern projection device comprises a light guiding sleeve, a mounting space configured to mount the plurality of first light sources is defined at one end of the light guiding sleeve and a gating sheet is arranged at the other end of the light guiding sleeve.

16. The starry sky lamp according to claim 15, wherein the reflective dynamic projector further comprises a fifth gear and a sixth gear meshed with the fifth gear, the fifth gear is arranged on the output axis of the motor and the sixth gear is arranged on the light guiding sleeve, a diameter of the fifth gear is different from that of the sixth gear.

17. The starry sky lamp according to claim 10, wherein the reflective dynamic projector further comprises a light-transmitting light shade configured to cover the reflective element.

18. The starry sky lamp according to claim 17, wherein there is a plurality of protrudes arranged on an inner wall of the light-transmitting light shade.

* * * * *